United States Patent
Helminen et al.

(10) Patent No.: US 11,951,634 B2
(45) Date of Patent: Apr. 9, 2024

(54) SYSTEM AND A METHOD FOR FORMING A CONTROLLED SAFETY AREA FOR A MANIPULATOR

(71) Applicant: EID ROBOTICS OY, Kuopio (FI)

(72) Inventors: Jari Helminen, Kuopio (FI); Paavo Käkelä, Tupos (FI); Mika Mäkinen, Tampere (FI); Antti Saari, Kuopio (FI)

(73) Assignee: EID ROBOTICS OY, Kuopio (FI)

( * ) Notice: Subject to any disclaimer, the term of this patent is extended or adjusted under 35 U.S.C. 154(b) by 379 days.

(21) Appl. No.: 17/439,464

(22) PCT Filed: Mar. 15, 2019

(86) PCT No.: PCT/FI2019/050223
§ 371 (c)(1),
(2) Date: Sep. 15, 2021

(87) PCT Pub. No.: WO2020/188137
PCT Pub. Date: Sep. 24, 2020

(65) Prior Publication Data
US 2022/0152831 A1      May 19, 2022

(51) Int. Cl.
*B25J 9/16* (2006.01)
*B25J 19/06* (2006.01)
*G01V 8/20* (2006.01)

(52) U.S. Cl.
CPC ............. *B25J 9/1676* (2013.01); *B25J 19/06* (2013.01); *G01V 8/20* (2013.01)

(58) Field of Classification Search
CPC ........... B25J 9/1676; B25J 19/06; G01V 8/20; G05B 19/4061
See application file for complete search history.

(56) References Cited

U.S. PATENT DOCUMENTS 11,511,432 B2 * 11/2022 Lehment .................. B25J 19/02
2009/0289791 A1 * 11/2009 Onishi .................... G01V 8/18
340/555

(Continued)

FOREIGN PATENT DOCUMENTS

DE       102005003827 A1      7/2006

OTHER PUBLICATIONS

International Search Report and Written Opinion dated Jan. 2, 2020 in PCT/FI2019/050223 (10 pages).

*Primary Examiner* — Kira Nguyen
(74) *Attorney, Agent, or Firm* — Meunier Carlin & Curfman LLC

(57) ABSTRACT

A system for forming a controlled safety area for a manipulator which system comprises a control unit being arranged to monitor the controlled safety area in order to prevent human entering to the controlled safety area to be hit by the manipulator working within the controlled safety area. The system according to the invention comprises at least one laser scanner being arranged to form at least one laser scanning wall such that the controlled safety area is divided in to a high grade safety area in between the at least one laser scanning wall, and to low a grade safety area outside the at least one laser scanning wall. The system comprises also at least one area detecting laser scanner arranged to detect humans at least in the low grade safety area around the high grade safety area. Furthermore, in the system according to the invention the control unit is arranged to control the at least one laser scanner to form an at least one virtual door in to the at least one laser scanning wall through which a human detected in the low grade safety area by the area detecting laser scanner can safely enter from the low grade safety area to the high grade safety area. The invention (Continued)

relates also to a method for forming a controlled safety area for a manipulator.

14 Claims, 2 Drawing Sheets

(56) References Cited

U.S. PATENT DOCUMENTS

| | | |
|---|---|---|
| 2017/0052278 A1 | 2/2017 | Stein et al. |
| 2017/0199299 A1* | 7/2017 | Braune ............... H04L 67/12 |
| 2018/0120804 A1* | 5/2018 | Higuchi ............... F16P 3/14 |
| 2018/0232593 A1* | 8/2018 | Tani ............... F16P 3/142 |

* cited by examiner

SYSTEM AND A METHOD FOR FORMING A CONTROLLED SAFETY AREA FOR A MANIPULATOR

CROSS REFERENCE TO RELATED APPLICATIONS

This application is a United States National Phase Patent Application of International Patent Application Number PCT/FI2019/050223, filed on Mar. 15, 2019, which is incorporated by reference herein in its entirety.

FIELD OF THE INVENTION

The invention relates to a system and a method for forming controlled safety area for a manipulator.

BACKGROUND OF THE INVENTION

In many production lines industrial robots, manipulators or corresponding automatic manipulating devices (hereinafter "industrial manipulator" or "manipulator") have been frequently employed to take care of different kinds of tasks of the production process in question. Thus, such automatically controlled industrial manipulators usually move independently within a work site of a factory where they also have to co-operate with human-workers. Therefore, in to the areas where the said industrial manipulators are present so called safety areas have been arranged in order to prevent the humans and industrial manipulators from hitting to each other by accident and thus humans to be injured. Presently, such safety areas are typically enclosed by mechanical safety fences having one or more openable ports or doors to make it possible for e.g. the ground staff to enter in to the safety areas for carrying out required maintenance operations. Thus, in order to ensure that entering in to the safety area does not risk the humans health and life the doors or ports of the safety area have been connected to the control unit of the industrial manipulators such that all these industrial manipulators working within such area are immediately stopped when any of the ports or doors of the safety area is opened.

The present safety systems employed in the safety areas will ensure that the person entering in to the safety area will not get hurt by the moving industrial manipulator. However, a drawback of the present systems is that in many cases stopping of any of the industrial manipulators working in such safety areas will interrupt the whole production process of the factory. This is because in many cases the process phases of the production line or process are so linked to each other that stopping of a single production phase will totally stop or at least seriously hinder the whole production line or process. Such production breaks or slow-downs reduce efficiency, productivity and profitability of the factory. Therefore, it is worth to try to minimize all kinds of additional interruptions which can be done without compromising human health and the safety at work.

BRIEF DESCRIPTION OF THE INVENTION

The aim of the present invention is to form a system for forming a controlled safety area for a manipulator by means of which the amount of interruptions of industrial manipulator working in the safety area can be reduced without compromising safety at work.

The aim of the invention is reached by the present system and method because in the system and method according to the invention instead of a single safety area with the safety fences within the area of influence of the manipulator a low grade safety area and a high grade safety area is defined by means of at least one laser scanning wall to which it is formed a virtual door for a human in a suitable position according to position information of the human formed by an area detecting laser scanner detecting humans at least in the low grade safety area such a way that the human can enter through the said virtual door from the low grade safety area in to the high grade safety area without a risk to get hit by the manipulator even the manipulator continues its function within a high grade safety area outside the position of the human inside the high grade safety area. More specifically, characteristic to the system according to the invention is described in the independent claim 1 and characteristic to the method according to the invention is described in the independent claim 8. The dependent claims 2-7 describes embodiments of the system according to the invention and the dependent claims 9-14 embodiments of the method according to the invention.

The advantage of the method according to the invention is that it is not necessary to always completely stop the manipulator when a human enters in to its area of influence because due to the system according to the invention the working area and/or functions manipulator can be limited such a way that risks of an accident at work for a human inside the said safety area is prevented. Therefore, a human, e.g. a person of ground staff can enter to the safety area such a way that the manipulator need not to be totally stopped. Therefore, in production lines equipped with the system and method according to the invention the amount of additional production breaks or slow-downs are remarkably reduced.

BRIEF DESCRIPTION OF THE DRAWINGS

Next, the invention is described in more detail with reference to the attached drawings wherein FIG. 1 Shows side view of a part of an automated production line wherein a controlled safety system according to an embodiment of the invention is employed and wherein a laser scanning wall arranged between a low grade safety area and high grade safety is shown.

DETAILED DESCRIPTION OF SOME PREFERRED EMBODIMENTS OF THE INVENTION

FIGS. 1 to 4 shows an automated production line 10 of a factory where the controlled safety system according an embodiment of the invention is applied. The automated production line 10 shown in the FIGS. 1 to 4 includes one or more manipulators working within area of the production line 10. The manipulators can be e.g. articulated industrial robots, linear robotic manipulators or other robot-like automatically moving apparatuses which includes at least one moving work implement being controlled to move within the area of the production line 10. The production line 10 can be any kind of fully automated production line or work cell e.g. a work cell wherein assembly of some electrical or mechanical end products an/or preparation of their components are carried out.

The production line 10 shown in the FIGS. 1 to 4 includes a frame 11 fixed on to the floor of the factory. In this case the frame 11 comprises plurality of transversal frame beams 12 and a pair of longitudinal frame beams 13. As shown in the FIGS. 1 and 2 the structure formed by the transversal frame beams 12 supports the longitudinal frame beams 13 in the both sides of the production line 10 at elevated position. The vertical position of the longitudinal frame beams 13 has been chosen such that a human can walk in to the area between the pair of longitudinal frame beams 13 under these longitudinal frame beams 13. The frame 11 comprises further plurality of vertical intermediate support posts 14. These have been attached between the floor and the longitudinal frame beams 13. The purpose of the intermediate support posts 14 is to ensure adequate load carrying capacity for the longitudinal frame beams 13. Thus, the amount of the intermediate support posts 14 may vary e.g. depending on the weight of the items being carried and/or handled in the production line 10.

Figure 4:
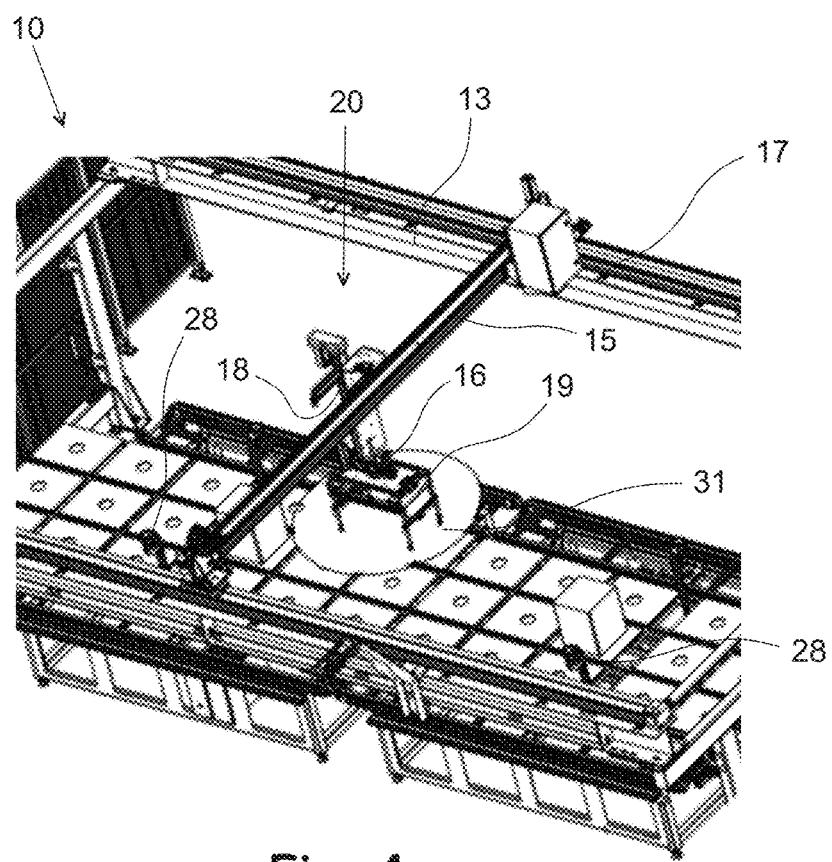
FIG. 4 Shows an oblique view of a part of the production line of the previous figures within the laser scanning walls.

As can be seen from the FIG. 4 it has been arranged a bridge crane type manipulator 20 in to the production line 10. The manipulator 20 is controlled automatically by a control system of the production line 10. The manipulator 20 has been arranged to move longitudinally along rails 17 on railway wheels, rolls or corresponding rolling elements between the ends of the production line limited by the transversal frame beams 12. The rails 17 extending between the ends of the production line 10 have been fixed on the longitudinal frame beams 13. The manipulator 20 comprises a transversal guide bar 15 extending between the rails 17. A carrier 16 has been arranged to move transversally along the transversal guide bar 15 by an actuator in between the longitudinal frame beams 13. The carrier 16 includes a vertically moving lifting arm 18. The lifting arm 18 has been arranged to move vertically upwards and downwards by an actuator at the carrier 16. At lower end of the lifting arm 18 there is a gripper 19 by means of which the manipulator can grip the items on the production line 10 below the manipulator 20. Thus, the manipulator 20 can carry and handle the items in between the area enclosed by the transversal frame beams 12 and the longitudinal frame beams 13. Furthermore, the production line 10 can include also other types of manipulators and/or automated apparatuses acting and/or moving in the area limited by the transversal frame beams 12 and the longitudinal frame beams 13.

In to the production line 10 of FIGS. 1 to 4 it has been arranged a controlled safety system having a controlled safety area 21. The controlled safety system enables that human workers can safely enter to in to the production line 10 during the production. In case of production line 10 the controlled safety area covers the area between the transversal frame beams 12 and longitudinal frame beams 13 as well as an area (show in the FIG. 3) that extends some extent outside from the longitudinal frame beams 13.

The controlled safety system comprises a control unit being arranged to monitor the controlled safety area 21 in order to prevent human entering to the controlled safety area 21 to be hit by the manipulator 20 working within the controlled safety area 21.

The controlled safety system comprises at least one laser scanner 22 being arranged to form at least one laser scanning wall 23. In case of the production line 10 of the FIGS. 1 to 4 the laser scanning walls 23 are formed by one or more laser scanners 22 in connection with the longitudinal frame beams 13. As shown in the FIGS. 1 and 2 the laser scanners 22 have been arranged in to elongated casings 24 under the longitudinal frame beams 13. The laser scanners 22 transmit laser beams 25 vertically towards the floor and thus forming planar laser scanning walls 23 that are parallel to the direction of the longitudinal frame beams 13 of the production line 10. Thus, in case of the production line 10, the laser scanners 22 and laser scanning walls 23 have been arranged only in connection with longitudinal sides of the production line 10. However, in other embodiments laser scanning walls may be placed also in connection with transversal end sides of the production line as well as in some other embodiments laser scanning walls may be included also in between the longitudinal sides and/or transversal ends of the production line.

Figure 1:
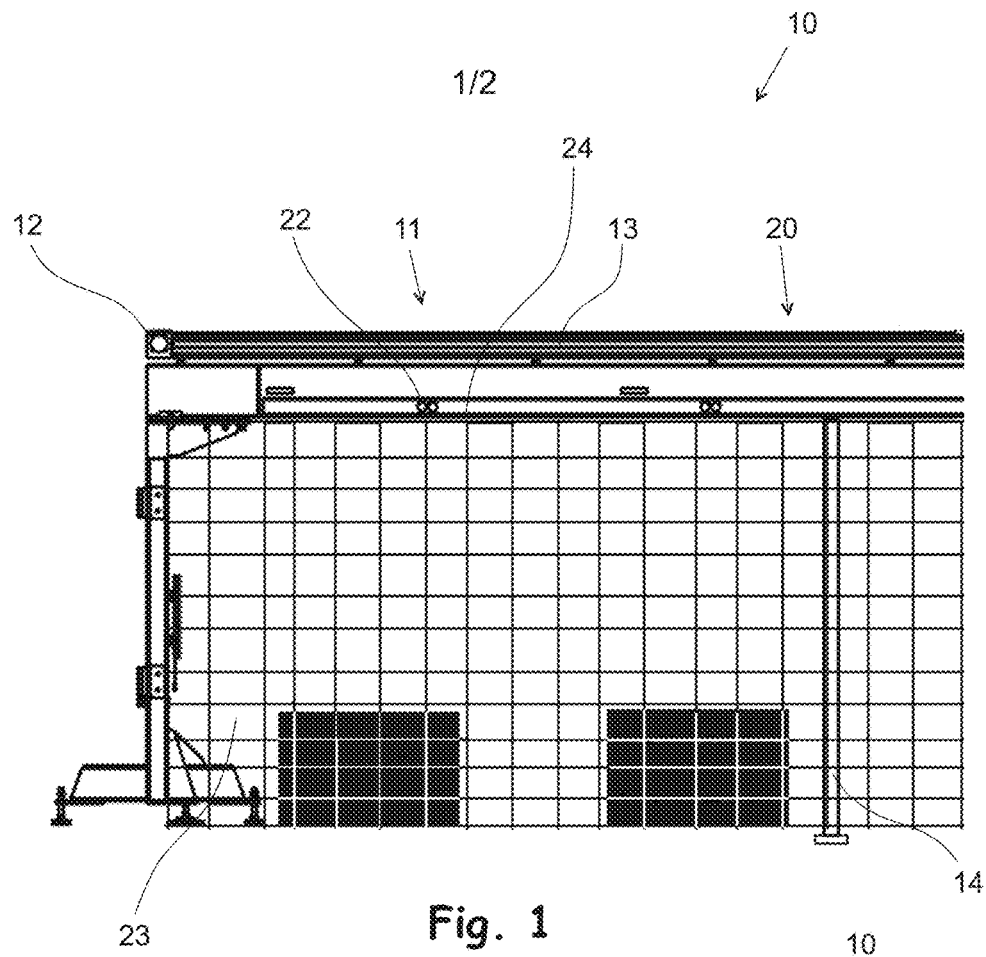
Figure 2:
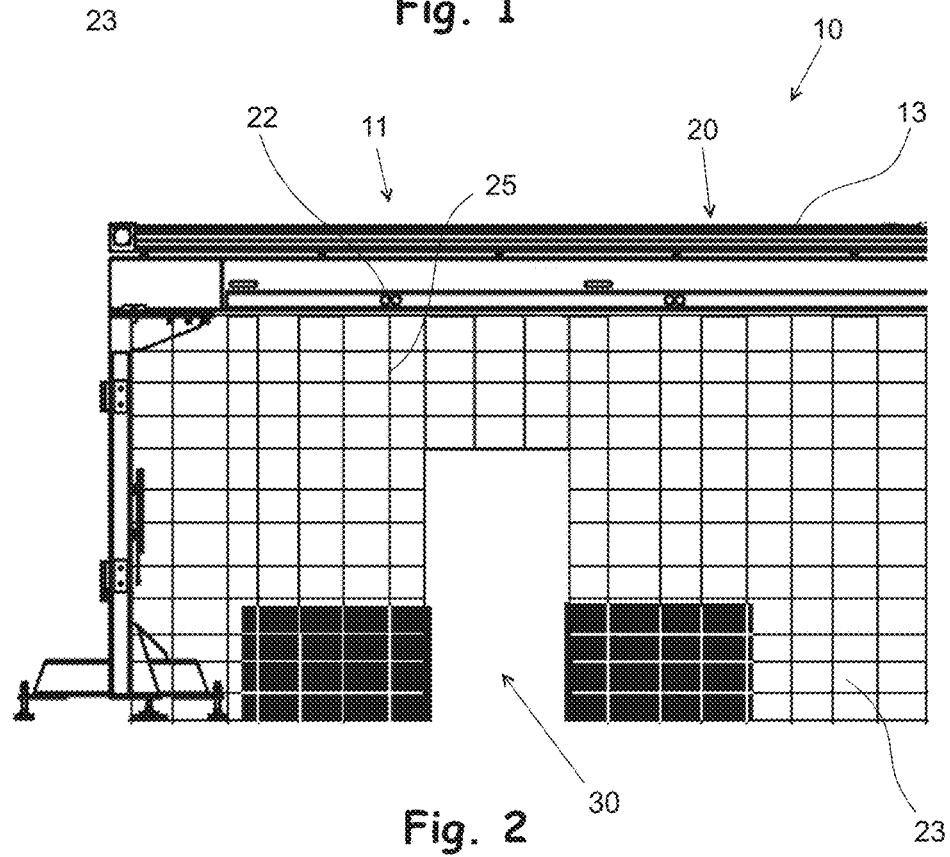
FIG. 2 Shows a side view of the same part of the production line of FIG. 1 as in FIG. 1 when a virtual door for a human to enter from the low grade safety area in to the high grade safety area is shown.
Figure 3:
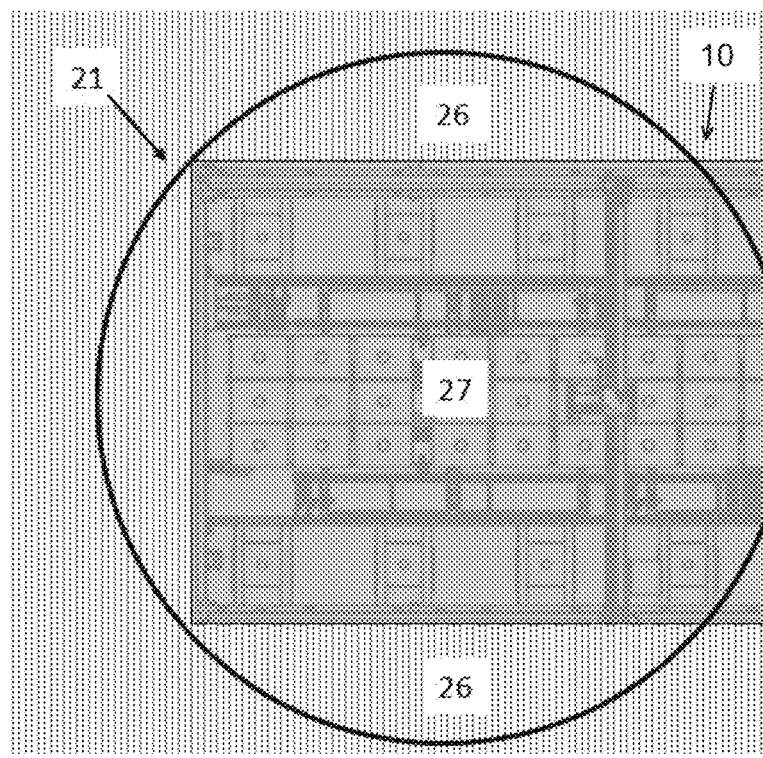
FIG. 3 Shows a part of the production line of the previous figures seen from above wherein area of a laser area scanner for detecting humans in the low grade safety as well as in the high grade safety area are shown.

The laser scanning wall 23 has been arranged to divide the controlled safety area 21 in to a high grade safety area 27 in between the at least one laser scanning wall 23, and to low a grade safety area 26 outside the at least one laser scanning wall 23. In the FIG. 3 it is shown the high grade safety area 26 and the low grade safety area 26 of the production line 10. The high grade safety area 26 is the area which is enclosed by the laser scanning walls 23 and the transversal frame beams 12. The low grade safety area 26 is an area outside the laser scanning walls 23 that surrounds the laser scanning walls 23. The low grade safety area 26 extends some extent to the outside direction from the laser scanning walls 23. In FIGS. 1 to 3 the laser scanning walls 23 are vertical i.e. perpendicular to the plane formed by the floor at the area of the production line 10. However, the controlled safety system may include also laser scanner walls being oriented obliquely with respect to floor of the production line. Furthermore, there may be also laser scanning walls that are parallel or in some oblique angle to transversal frame beams 12 e.g. at the ends of the production line 10.

The at least one laser scanner 22 is controlled by the control unit of the controlled safety system. Thus, the control unit detects if a human or corresponding object enters from the low grade safety area 26 to the high grade safety area 27. In such case if a human or corresponding object enters unauthorizedly in to the high grade safety area 27 through the laser scanning wall 23 the production line 10 is immediately stopped and an alarm is provided.

The system shown in the FIGS. 1 to 3 comprises also at least one area detecting laser scanner 28. The area detecting laser scanner 28 has been arranged to detect humans at least in the low grade safety area 26 around the high grade safety area 27. In an embodiment shown in the FIGS. 1 to 4 the detecting area of the area detecting laser scanner 28 includes both the low grade safety area 26 and the high grade safety area 27. Preferably, the area detecting laser scanner 28 is arranged to form at least one mainly horizontal scanning plane. However, the detecting plane may also be in inclined angle in respect to a horizontal plane. Area detecting laser scanner 28 detects a human or corresponding object that enters in to its area of detection i.e. in to the low grade safety area 26 and high grade safety area. The area detecting laser scanner 28 is controlled by the control unit of the controlled safety system. Thus, the control unit can control the laser scanning wall according to data obtained from the area scanning laser scanner 28.

The control unit is arranged to control the at least one laser scanner 22 to form an at least one virtual door 30 in to the at least one laser scanning wall 23 through which a human in the low grade safety area 26 detected by the area detecting laser scanner 28 can safely enter from the low grade safety area 26 to the high grade safety area 27. The virtual door 30 is formed in to the laser scanning wall 23 at a position depending on the detected position of the human in the low grade safety area 26. Preferably, the virtual door 30 is formed to a position being as near as possible the position of the human in the low grade safety area 26.

In an embodiment the at least one laser scanner is attached movably within the controlled safety area 21. Movable attachments allows positioning of the laser scanner wall in suitable way in respect of the production line. The laser scanner may be attached to the frame 11 of the production line 10 through some movable and/or rotatable attachment elements. The attachment elements may include pivotable joints and arms and/or linearly within each other moving attachments to realize movable attachment of the laser scanner in suitable way.

In an embodiment the system comprises at least two laser scanners for forming at least two planar laser scanning walls which have been arranged to intersect to each other. This way plurality of planar laser scanning walls can be positioned within the production line in most suitable positions and in appropriate orientation with respect to each other. Each laser scanners can be attached movably and/or pivotably to the production line 10. This allows to adjust the positions and angle between the adjacent laser scanning walls suitably in respect of the production line such that high grade safety area covers whole working area of the industrial manipulator. Furthermore, in some embodiments a part or all laser scanners can be attached fixedly to the frame of the production line or to some other supporting structures within the controlled safety area 21 to be monitored.

In some embodiment the system may also comprise a guiding device with a display device arranged to show to a human in the low grade safety area permissible entering time in to the high grade safety area. The guiding device may be formed such that it comprises red light for indicating that entering through the virtual door to the high grade safety area is forbidden and a green light that entering through the virtual door to the high grade safety area is permitted.

The controlled safety system of the production line 10 shown in the FIGS. 1 to 4 allows a human, e.g. a person of ground staff to enter safely from the low grade safety area 26 in to the high grade safety area 26 without risk to get hurt by the manipulator working within the area. Thus, the controlled safety system of the production line 10 is always automatically activated during the use of the production line or if not the production line 10 is arranged stop if a human enters in to the area of influence of any of the manipulators of the production line 10. When activated the control unit of the controlled safety system controls the at least one laser scanner 22 as well as the at least one area detecting laser scanner 28 in following manner:

The at least one laser scanner 22 divides the controlled safety area in to a high grade safety area 27 in between an at least one laser scanning wall 23 formed by a laser scanner 22, and to low a grade safety area 26 outside the at least one laser scanning wall 23;

The at least one area detecting laser scanner 28 detects humans in at least the low grade safety area 26 around the high grade safety area 27;

In case when a human is within the low grade safety area 26 the at least one laser scanner 22 forms a virtual door 30 to the at least one laser scanning wall 23 through which a human can safely enter from the low grade safety area 26 to the high grade safety area 27. The virtual door 30 is formed by controlling the laser scanner 22 such that in the position of the virtual door 30 the detection of the laser scanner 22 is disabled.

The position of the virtual door 30 depends on the position of the human in the low grade safety area 26. However, in some embodiments also the forthcoming work phases and/or position of the manipulator 20 working within the high grade safety area 27 may be taken in to account in determining the position of the virtual door 30.

Normally the movements of the manipulator 20 are limited during the time when a human is within the high grade safety area 27. This is carried out e.g. by such that the control system of the production line 10 creates an restricted area for the manipulator 20 to which the manipulator does not move during the time when a human is within the high grade safety area 27. In case the manipulator needs to carry out some task within the restricted area the controlled safety system may give an audible and/or visible warning signal to ask the human to leave from the high grade safety area 27. However, the manipulator 20 does not enter in to the said restricted area until the human has left out from the high grade safety area 27. The audible request/warning signal may include spoken words or just some suitable warning tone. The visible signal may be, for instance, some coloured or white light signal formed by a light source (e.g. a lamp) or text in a display. In case of text shown in a display different types of information can be presented. Such an information may include e.g. the time when the human can re-enter in to the high grade safety area without hindering the work of the manipulator.

In an embodiment of the controlled safety system the position of the human in to the high grade safety area 27 is detected in real time and an alarm is provided if the human moves in to the high grade safety area 27 in to such position where the manipulator 20 may be present during its forthcoming work cycle. The human in the high grade safety 27 area can be detected e.g. by the same area detecting laser scanner 28 detecting also humans in the low grade safety area 26. However, in some embodiments there may be also separate or additional detection means for detecting humans in the high grade safety area 27.

In such embodiments as the embodiment of FIGS. 1 to 4 there may be a need to change the position of the at least laser scanning wall 23. For example, if the working area of one or more manipulators of the production line 10 need to be enlarged there is a need to change the position of the laser scanning wall 23. The position of the at least one laser scanning wall 23 can be changed by moving the at least one laser scanner 22. This can be accomplished by moving or changing orientation of the laser scanner 22 such position of the that laser scanning wall 23 is changed appropriately.

The controlled safety system according the invention may be realized in many ways differently from the embodiments described above. The system according to the present invention can e.g. include in addition to the at least one area safety scanner further safety scanners such as e.g. a gripper safety scanner 29 placed at the end of the moving arm of the manipulator. A gripper safety scanner 29 can be arranged to scan spherical space or area 31 surrounding the gripper 19 at the end of the lifting arm 19 of the manipulator 20 as it is shown in the FIG. 4. Thus, by means of such gripper safety scanner 29 it may be possible to allow the manipulator 20 to work within a portion of the high grade safety area 27 also during the time when one or more humans exist in that same area since the gripper safety scanner 29 may be arranged ensure that the manipulator 20 and/or gripper of the manipulator 19 would escape or stop in case if the distance between it and the human is smaller than a predetermined safety gap. Furthermore, also other safety scanners can be arranged e.g. to some moving or rotating devices or apparatuses that exist in the production line in question. Thus, due to such additional safety scanners also these devices need not to be totally stopped during the time when a human is within their area of influence.

Consequently, the invention is not limited to the embodiments described above, but can vary within the scope of the appended claims.

The invention claimed is:

1. A system for forming a controlled safety area for a manipulator which system comprises a control unit being arranged to monitor the controlled safety area in order to prevent human entering to the controlled safety area to be hit by the manipulator working within the controlled safety area wherein the system comprises:
    at least one laser scanner being arranged to form at least one laser scanning wall such that the controlled safety area is divided in to a high grade safety area in between the at least one laser scanning wall, and to low a grade safety area outside the at least one laser scanning wall;
    at least one area detecting laser scanner arranged to detect humans at least in the low grade safety area around the high grade safety area; and wherein
    the control unit is arranged to control the at least one laser scanner to form an at least one virtual door in to the at least one laser scanning wall through which a human in the low grade safety area detected by the area detecting laser scanner can safely enter from the low grade safety area to the high grade safety area.

2. The system according to the claim 1, wherein the at least one laser scanner is attached movably within the controlled safety area.

3. The system according to the claim 1, wherein the system comprises at least two laser scanners for forming at least two planar laser scanning walls which have been arranged to intersect to each other.

4. The system according to claim 1, wherein the at least one laser scanner forming the at least one laser scanning wall is arranged to form at least one vertical scanning plane.

5. The system according to claim 1, wherein the area detecting laser scanner is arranged to form at least one mainly horizontal scanning plane.

6. The system according to claim 1, wherein the system comprises a guiding device with a display device arranged to show to a human in the low grade safety area permissible entering time in to the high grade safety area.

7. The system according to the claim 6, wherein the display device comprises red light for indicating that entering through the virtual door to the high grade safety area is forbidden and a green light that entering through the virtual door to the high grade safety area is permitted.

8. A method for forming a controlled safety area for a manipulator wherein the controlled safety area is monitored in order to prevent human entering to the controlled safety area to be hit by the manipulator working within the controlled safety area, and wherein the method comprises method steps of:
    dividing the controlled safety area in to a high grade safety area in between an at least one laser scanning wall formed by a laser scanner, and to low a grade safety area outside the at least one laser scanning wall;
    detecting humans in at least the low grade safety area around the high grade safety area by an at least one area detecting laser scanner;
    controlling the at least one laser scanner to form a virtual door to the at least one laser scanning wall through which a human in the low grade safety area detected by the area detecting laser scanner can safely enter from the low grade safety area to the high grade safety area.

9. The method according to claim 8, wherein the position of the virtual door is formed in the nearest possible position in respect to the detected position of a human in the low grade safety area.

10. The method according to claim 8, wherein the position of the at least one laser scanning wall is changed by moving the at least one laser scanner.

11. The method according to claim 8, wherein the virtual door is formed by controlling the laser scanner such that at the position of the virtual door the detection of the laser scanner is disabled.

12. The method according to claim 8, wherein the movements of the at least one manipulator are limited during the time when a human is within the high grade safety area.

13. The method according to claim 8, wherein the position of the human in to the high grade safety area is detected in real time, and wherein an alarm is provided if the human moves in the high grade safety area in to such position where the manipulator may be present during its forthcoming work cycle.

14. The method according to claim 8, wherein the position of the human in the high grade safety area is detected by the same area detecting laser scanner detecting also humans in the low grade safety area.

* * * * *